United States Patent [19]

Allen, Jr. et al.

[11] 3,900,563

[45] Aug. 19, 1975

[54] METHOD OF USING 3-[2-(4-PHENYL-1-PIPERAZINYL)ETHYL]-INDOLINES

[75] Inventors: George Rodger Allen, Jr., Old Tappan, N.J.; Francis Joseph McEvoy, Pearl River, N.Y.; Vern Gordon VeVries, Ridgewood, N.J.; Daniel Bryan Moran, Suffern, N.Y.; Ruddy Littell, River Vale, N.J.

[73] Assignee: American Cyanamid Company, Stamford, Conn.

[22] Filed: May 24, 1974

[21] Appl. No.: 473,029

Related U.S. Application Data

[63] Continuation-in-part of Ser. No. 371,201, June 18, 1973, abandoned, which is a continuation-in-part of Ser. No. 147,700, May 27, 1971, Pat. No. 3,751,416.

[52] U.S. Cl. .............................................. 424/250
[51] Int. Cl.² ........................................ A61K 27/00
[58] Field of Search.................... 371/201; 424/250

*Primary Examiner*—Stanley J. Friedman
*Attorney, Agent, or Firm*—Ernest Y. Miller

[57] ABSTRACT

This disclosure describes a method of using compounds of the class of substituted 3-[2-(4-phenyl-1-piperazinyl)ethyl]-indolines for the management of the manifestations of psychotic disorders, the treatment of psychoneurotic conditions, anxiety and tension in warm-blooded animals.

10 Claims, No Drawings

METHOD OF USING 3-[2-(4-PHENYL-1-PIPERAZINYL)ETHYL]-INDOLINES

This application is a continuation-in-part of application Ser. No. 371,201, filed June 18, 1973 now abandoned, which is a continuation-in-part of our application Ser. No. 147,700, filed May 27, 1971, now U.S. Pat. No. 3,751,416, issued Aug. 7, 1973.

SUMMARY OF THE INVENTION

This invention relates to a new use of organic compounds and, more particularly, is concerned with the administration of substituted 3-[2-(4-phenyl-1-piperazinyl)ethyl]indolines. The active components, substituted 3-[2-(4-phenyl-1-piperazinyl)ethyl]indolines of the present invention may be represented by the following general formula:

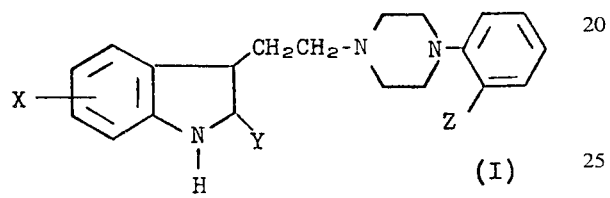

wherein X is 5,6-dimethoxy or 5,6-methylenedioxy; Y is hydrogen or methyl and Z is hydrogen or methoxy with the proviso that when X is 5,6-dimethoxy and Z is methoxy, then Y must be methyl; and the pharmacologically acceptable acid addition salts thereof.

DETAILED DESCRIPTION OF THE INVENTION

The active components of the present invention, substituted 3-[2-(4-phenyl-1-piperazinyl)ethyl]indolines of the present invention are obtainable as crystalline materials having characteristic melting points and absorption spectra. They are appreciably soluble in many organic sq vents such as lower alkanols, acetone, ethyl acetate, and the like but are generally insoluble in water. These compounds are organic bases and thus are capable of forming acid-addition and quaternary ammonium salts with a variety of organic and inorganic salt-forming reagents. Thus, acid-addition salts, formed by admixture of the organic free base with up to three equivalents of an acid, suitably in a neutral solvent, are formed with such acids as sulfuric, phosphoric, hydrochloric, hydrobromic, sulfamic, citric, maleic, fumaric, tartaric, acetic, benzoic, gluconic, ascorbic, and related acids. The acid-addition salts of the substituted 3-[2-(4-phenyl-1-piperazinyl)ethyl]indolines are, in general, crystalline solids relatively soluble in water, methanol and ethanol but relatively insoluble in non-polar organic solvents such as diethyl ether, benzene, toluene, and the like. For purposes of this invention, the free bases are equivalent to their non-toxic acid-addition salts.

The active components of the present invention may exist in several isomeric forms such as stereoisomers. It is to be understood that the present invention includes within its scope all such isomeric forms. For example, those 3-[2-(4-phenyl-1-piperazinyl)ethyl]indolines in which Y is methyl, may exist as cis and trans isomers. The nuclear magnetic resonance spectra are particularly helpful in characterizing these isomers or mixtures of these geometrical isomers. Moreover, the active components of formula I have an asymmetric carbon atom at C-3, and optical isomers involving this asymmetric center are possible. In those compounds of formla I wherein Y is methyl, a second asymmetric center is present at C-2. These isomers may be separated by methods known to those skilled in the art.

The substituted 3-[2-(4-phenyl-1-piperazinyl)ethyl]-indolines as active components of the present invention may be prepared by the series of reactions set forth in the following reaction scheme:

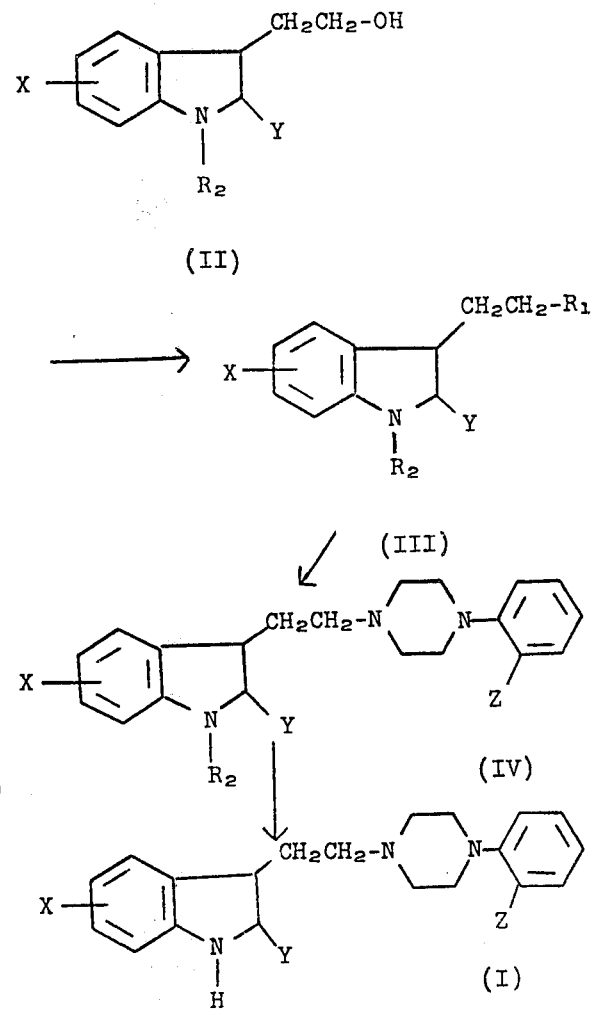

wherein X, Y, and Z are as hereinabove defined; and $R_1$ is chloro, bromo, methanesulfonyloxy or p-toluenesulfonyloxy and $R_2$ is benzoyl or lower alkanoyl. In accordance with this reaction scheme, treatment of the 3-indoline ethanol (II) with phosphorus trichloride or phosphorus tribromide is productive of 3-indoline ethyl chloride or bromide (III), $R_1$=Cl or Br), respectively. Alternatively, treatment of the 3-indoline ethanol (II) with methanesulfonyl chloride or p-toluenesulfonyl chloride in a solvent such as pyridine or collidine gives the sulfonyl ester (III), $R_1$=CH$_3$SO$_3$ or p-CH$_3$C$_6$H$_4$SO$_3$). Reaction of the intermediates (III) with a 4-phenylpiperazine of the formula:

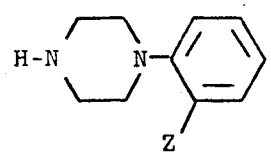

wherein Z is as hereinabove defined, gives the phenyl-piperizinyl ethyleneindolines (IV). This reaction is preferably conducted in an inert medium such as benzene, toluene, xylene, dioxane, and the like at temperatures of 50°–140°C. However, temperatures of 100°–110°C. are preferable. The conversion of the 1-acyl-3-aminoethyleneindolines (IV) to the substituted 3-[2-(4-phenyl-1-piperazinyl)ethyl]indolines (I) may be effected by acidic or basic hydrolysis. Mineral acid hydrolysis is particularly useful for this conversion. The preferred conditions consist of treating (IV) with boiling 6N hydrochloric acid solution for one-fifth to one-half hour.

The 1-acyl-3-indoline ethanols (II) which may serve as starting materials for the substituted 3-[2-(4-phenyl-1-piperazinyl)ethyl]indolines (I) may be prepared by several procedures. In those instances when Y is hydrogen in (II), the appropriate 1-acyl-3-indoline ethanol may be prepared as set forth in the following reaction scheme:

wherein X and $R_2$ are as hereinabove defined and $R_3$ is lower alkyl of from 1 to 4 carbon atoms or phenyl lower alkyl such as benzyl, α-phenethyl and β-phenethyl. In accordance with this reaction scheme, condensation of an oxindole (V) with an oxalate ester (such as dimethyl oxalate, diisopropyl oxalate, etc.) affords the corresponding isatylidene ester (VI). The last substance may be converted into the 1-acyl-3-indoline ethanols (XII) by several routes. Clemmensen reduction of the isatylidene ester (VI) gives the oxindoleacetic ester (VII). Diborane reduction of (VII) then gives the indoline ethanol (IX). Alternatively, the isatylidene ester (VI) may be converted directly into the indoline ethanol (IX) by reduction with excess diborane. When the esterifying group ($R_3$) is benzyl, catalytic hydrogenation of the isatylidene ester (VI) using a palladium-on-carbon catalyst affords the oxindoleacetic acid (VIII). This last substance may be converted into the indoline ethanols (IX). Thus, treatment of (VIII) with a lower alkyl chloroformate produces a mixed carbonic anhydride. Reduction of this carbonic anhydride with sodium borohydride gives the oxindolylethanol (X). Treatment of (X) with diborane then affords the indoline ethanol (IX). The conversion of (IX) into the useful 1-acyl-3-indoline ethanols (XII) may be accomplished by either of two procedures. Thus, treatment of (IX) with an acyl halide ($R_2$Cl or $R_2$Br) or an acyl anhydride ($R_2$)$_2$O under Schotten-Bauman conditions affords the 1-acyl-3-indoline ethanol (XII) directly. Alternatively, treatment of the indoline ethanol (XI) with an acyl halide or an acyl anhydride in pyridine produces the O,N-diacyl derivative (XI). The O-acyl group may be removed selectivly to give the 1-acyl-3-indoline ethanol (XII). Sodium methoxide in methanol is particularly useful for this de-O-acylation. Solutions of ammonia or triethylamine in methanol may also be used for this selective deacylation.

Other important 1-acyl-3-indoline ethanols may be obtained in accordance with the following reaction scheme:

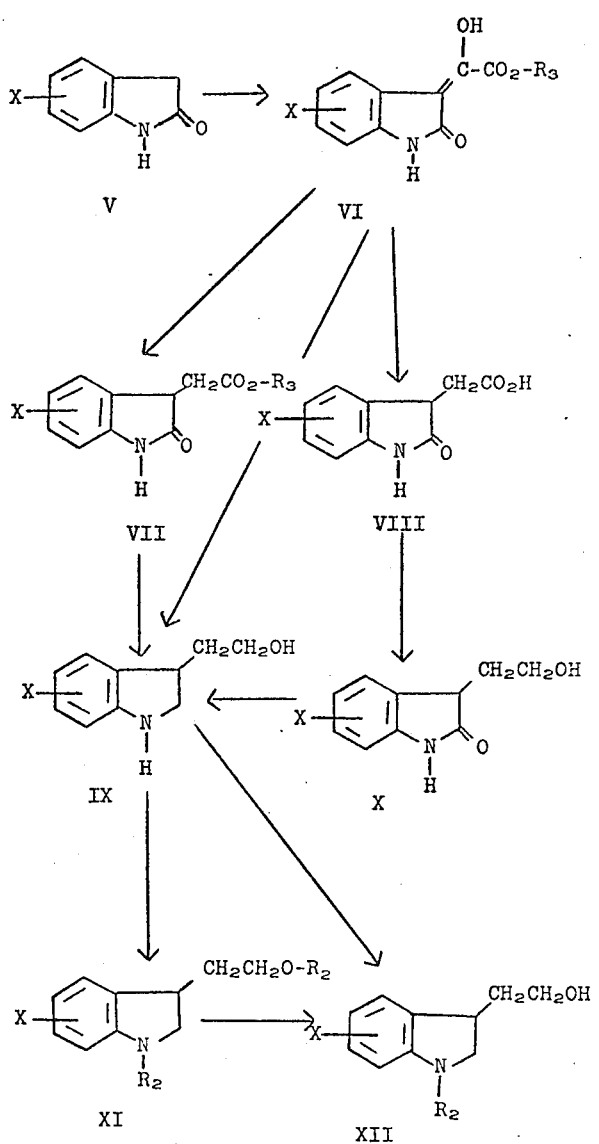

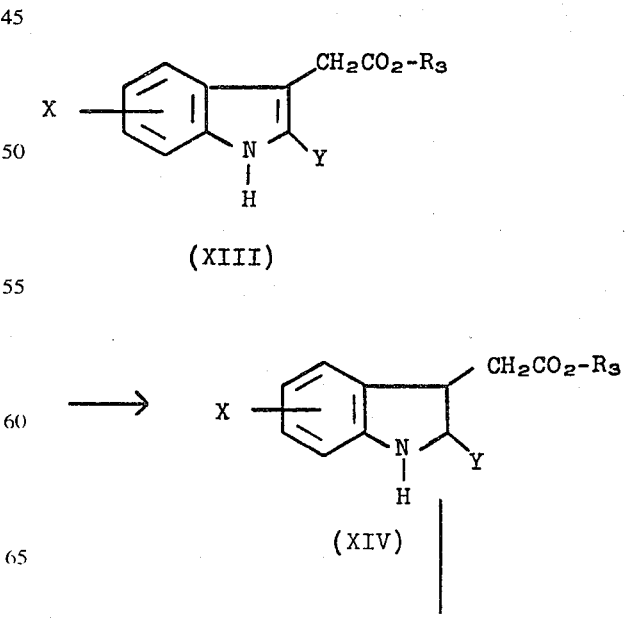

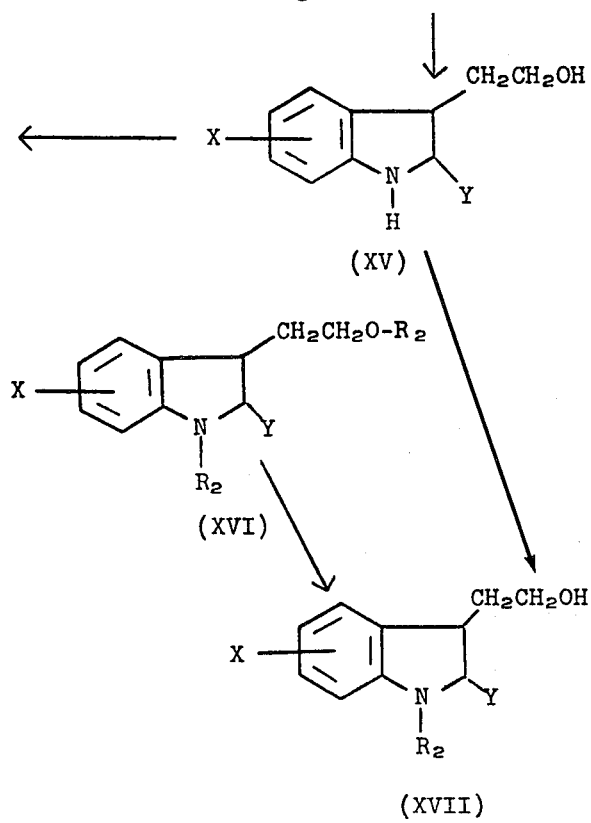

wherein X, Y, $R_2$ and $R_3$ are as hereinbefore described. The reduction of the 3-indoleacetic esters (XIII) to the corresponding 3-indolineacetic esters (XIV) is carried out in a manner described in the examples hereinafter. Reduction of the 3-indolineacetic esters (XIV) with a metal hydride reagent, such as lithium aluminum hydride, is productive of the 3-indoline ethanols (XV). This last substance may be converted directly into the useful 1-acyl-3-indoline ethanol (XVII) by acylation under Schotten-Bauman conditions with the appropriate acyl halide ($R_2Cl$ or $R_2Br$) or acyl anhydride ($R_2)_2O$. Alternatively, treatment of (XV) with an acyl halide or acyl anhydride in a solvent such as pyridine, lutidine, collidine, and the like gives the O,N-diacyl derivative (XVI). Treatment of (XVI) with sodium methoxide in methanol then gives the important 1-acyl-3-indoline ethanol (XVII).

The compounds of general formula (I) of the present invention are physiologically active on the central nervous system and show high activity as tranquilizers, antipsychotic or neuroleptic agents at non-toxic doses. A useful test for antipsychotic activity consists of measuring the reduction of spontaneous motor activity in animals by means of an actophotometer (a photoelectric device for quantitatively measuring locomotor activity). Graded doses of the active compounds prepared by the processes of this invention are administered to groups of mice and rats, and the effective dosage range for a significant reduction of motor activity (a measure of neuroleptic effect) compared to control groups is established. The use of reduced motor activity as a measure of tranquilizing activity has been described by W. D. Gray, A. C. Osterberg and C. E. Rauh, Archives Internationales et de Therapie, Vol. 134, p. 198 (1961) and W. J. Kinnard and C. J. Carr, Journal of Pharmacology and Experimental Therapeutics, Vol. 121, p. 354 (1957).

The effective dose that caused a 50% reduction in motor activity ($MDD_{50}$), expressed in milligrams per kilogram of body weight, of some typical compounds of the present invention is set forth in Table I below.

TABLE I

| Compound | Species | Estimated $MDD_{50}$; mg./kg. (Route of Administration) |
|---|---|---|
| Compound A 5,6-dimethoxy-2-methyl-3-[2-(4-phenyl-1-piperazinyl)ethyl]indoline | mice mice rats rats | 0.2 (intraperitoneal) 1 (oral) 1 (intraperitoneal) 3.3 (oral) |
| Compound B 6,7-dihydro-7- 2-[4-(o-methoxyphenyl)-1-piperazinyl]ethyl -5H-1,3-dioxolo[4,5-f]-indole difumarate | mice | 1.1 (intraperitoneal) |
| Compound C 5,6-dimethoxy-3- 2-[4-(o-methoxyphenyl)-1-piperazinyl]ethyl -indoline trihydrochloride | mice | 9 (intraperitoneal) |
| Compound D 5,6-dimethoxy-2-methyl-3-[2-(4-phenyl-1-piperazinyl)ethyl]-indole, oxypertine | mice mice rats rats | 3.4 (intraperitoneal) 4 (oral) 20 (intraperitoneal) 9.4 (oral) |

Additional central nervous system tests are also useful in further defining the antipsychotic-antipsychoneurotic profile of activity shown by the new components of the present invention, as exemplified by the following procedures:

Rod Walking Test: Groups of 6 to 10 mice each were tested for their inability to walk across a horizontal rod in a normal manner after receiving graded intraperitoneal doses of the test compounds. A medium effective dose, rod walking dose (RWD) is estimated. The results appear in Table II.

TABLE II

| Compound | Estimated Dose mg./kg. |
|---|---|
| A | 2.5 |
| B | 2.5 |
| D | 37 |

Compounds A, B, and D are described in Table I.

Antagonism of Apomorphine Gnawing Behavior: The use of this method for recognizing neuroleptic actions has been described by P. A. Jenssen, et al., Arzneimittelforschung, Vol. 10, pp. 1003–1005 (1960) and by G. Stille, et al., Arzneimittelforschung, Volume 15, pp. 841–843 (1965). The following method is a modification of the Janssen, et al. procedure. Graded doses of the test compounds were administered orally to groups of 8 rats each, one-half hour before the intravenous injection of 1.2 mg./kg. of apomorphine (estimated to cause gnawing behavior in 100% of the rats). The gnawing syndrome is described as a compulsive and continuous sniffing followed by hard biting of the wire mesh cage floor, and is apparent within 10 minutes and last for about 45 minutes. The presence or lack of gnawing behavior in each rat was recorded by observation. For each experimental run there were two control rats treated with starch one half hour before the apomorphine. The effectiveness of the compounds in protecting against the gnawing behavior in rats at various doses is recorded in Table III.

TABLE III

| Compound | Dose | Degree of Protection |
|----------|------|----------------------|
| A | 66 mg./kg. | No effect |
| D | 22 (12–40) | $ED_{50}$% (95% confidence limits) |

Compounds A and D are as in Table I.

Catalepsy: In this test rats are considered to be in a cataleptic state if they maintain, for longer than 10 seconds, a position of 4 legs on 4 corks which have been secured to a stationary block. Untreated (control) rats always remove one or more legs in less than 10 seconds (usually immediately). Graded doses of the test compounds were orally administered to groups of 5 or more rats which were then tested for catalepsy at 30 minute intervals for 3 hours. The results appear in Table IV.

TABLE IV

| Compound | Dose mg./kg. | % Animals Showing Catalepsy |
|----------|--------------|------------------------------|
| A | 5 | 12 |
|   | 10 | 31 |
|   | 20 | 30 |
|   | 50 | 42 |
|   | 100 | 67 |
| D | 1.25 | 8 |
|   | 2.5 | 28 |
|   | 5.0 | 36 |
|   | 10. | 20 |
|   | 20. | 68 |
|   | 40 | 88 |

Compounds A and D are as in Table I.

Ptosis: Ptosis is defined as closure of the palpebral aperture (eyelid) greater than 70%. The compounds to be tested were administered orally to groups of 10 rats each. Periodically after treatment the rats were gently placed on the cage top and examined for 90 seconds for signs of ptosis. This manipulation eliminates spontaneous ptosis. The rats were then dropped from a height of about 18 inches (exteroceptive stimulation) onto the cage top to test for reversibility of the ptosis. Reversibility is defined as less than 70% closure of the palpebral aperture for longer than one minute after the exteroceptive stimulation. Reference, Tedeschi, D. H., "Criteria for the Selection of Pharmacological Test Procedures Useful In the Evaluation of Neuroleptic Drugs", Proceedings of the VI International Congress of the Collegium Internationale Neuropsychopharmacologicum, pp. 145–153 (1968). The results appear in Table V.

TABLE V

| Compound | Median Dose, mg./kg. $ED_{50}$ (95% Confidence Limits) |
|----------|--------------------------------------------------------|
| A | 0.33 (0.16 – 0.68) |
| D | 1.05 (0.36 – 3.10) |

Compounds A and D are as in Table I.

Protection vs. Pentylenetetrazole: Rats were treated orally with graded doses of the test compounds. Thirty minutes later pentylenetetrazole (Metrazol) was administered at a dose of 21 mg./kg. intravenously (dose estimated to cause seizures in 100% of the rats). The dose where 50% of the rats are protected from seizures is calculated by the method of Litchfield, J. T. and Wilcoxon, F. "A Simplified Method of Evaluationg Dose-Effect Experiments", Journal of Pharmacology and Experimental Therapeutics, Volume 96, pages 99–113 (1949). The results appear in Table VI.

TABLE VI

| Compound | Median Dose, mg./kg; $ED_{50}$ (95% Confidence Limits) |
|----------|---------------------------------------------------------|
| A | 3.8 (0.03 – 15.6) |
| D | 34.3 (6.8 – 355) | compounds A and D are as in Table I.

Effects on Amphetamine Stereotyped Behavior: Rats were treated orally with several doses of the compounds to be tested. Thirty minutes later the rats were treated with d-amphetamine sulfate at a dose of 10 mg./kg. intraperitoneally. The rats were observed at periodic intervals for 2 hours for the effects on increased activity and amphetamine stereotyped behavior (rearing, sniffing, chewing, biting, gnawing).

Scoring Method:
0 = normal
1 = slight or occassional signs
2 = moderate or intermittent signs
3 = marked or continual signs
Total score of 3 rats per group
Mobile behavior (walking, darting) × 1
Stereotyped behavior (rearing, sniffing) × 1
(chewing, licking) × 2
(biting, gnawing) × 3

The results appear in Table VII.

TABLE VII

| Compound | No. of groups | Oral dose mg./kg. | Amphetamine Dose mg./kg. | | 30 | 60 | 90 | 120 |
|----------|---------------|-------------------|--------------------------|---|----|----|----|-----|
| A | 1 | 1.1 | 10 | M* | 0 | 0 | 0 | 0 |
|   |   |     |    | S* | 20 | 30 | 34 | 26 |
|   | 1 | 0 | 10 | M | 5 | 1 | 0 | 0 |
|   |   |   |    | S | 8 | 17 | 26 | 24 |
|   | 1 | 3.3** | 10 | M | 1 | 0 | 0 | 0 |
|   |   |       |    | S | 24 | 36 | 39 | 31 |
|   | 1 | 0 | 10 | M | 1 | 0 | 0 | 0 |
|   |   |   |    | S | 12 | 19 | 37 | 36 |
| D | 1 | 9.4** | 10 | M | 0 | 1 | 0 | 0 |
|   |   |       |    | S | 8 | 12 | 8 | 11 |
|   | 1 | 0 | 10 | M | 5 | 1 | 0 | 0 |

Results Following Oral Dose — Time After Treatment (Minutes)

Table VII—Continued

| Compound | No. of groups | Oral dose mg./kg. | Amphetamine Dose mg./kg. | | Time After Treatment (Minutes) | | | |
|---|---|---|---|---|---|---|---|---|
| | | | | | 30 | 60 | 90 | 120 |
| | 1 | 25 | 10 | S | 8 | 17 | 26 | 24 |
| | | | | M | 0 | 0 | 0 | 0 |
| | | | | S | 5 | 6 | 3 | 2 |
| | 1 | 0 | 10 | M | 0 | 0 | 0 | 0 |
| | | | | S | 7 | 20 | 34 | 36 |

*M = Weighted Mobile Score   S = Weighted Stereotyped Score
**Estimated dose reducing motor activity by 50%
Compounds A and D are the same as in Table I.

Open Field Behavior: Cats or monkeys were treated intraperitoneally with the compounds to be tested at several doses and observed for signs of drug effect for at least 3 hours, and again on the following day. The results appear in Table VIII.

TABLE VIII

| Compound | Species | No. of Animals | Dose mg./kg. | Result |
|---|---|---|---|---|
| A | Cat | 1 | 10 | Slight ataxia, slight relaxation of nictating membrane |
| | | 2 | 25 | Ataxia, relaxation of nicatating membrane, depression |
| D | Cat | 1 | 25 | Ataxis, relaxed nictating membrane, depression |
| A | "Hostile" Cat | 2 | 25 | Depression, 1 or 2 cats showed reduction of hostility |
| D | "Hostile" Cat | 1 | 25 | No change in hostility |
| A | Monkey | 2 | 10 | Somnolence Reduced flight reaction |
| | | 2 | 20 | Same as 10 mg./kg. but more intense |
| D | Monkey | 2 | 20 | 1 of 2 monkeys no signs, 1 of 2 monkeys sedation, aggression, catalepsy |
| | | 2 | 40 | Same as 20 mg./kg. but both monkeys more intense |

Compounds A and D are as in Table I.

The above classification tests demonstrate a broad usefulness of the new components of this invention as antipsychotic and antipsychoneurotic agents with a number of desirable characteristics. Compound A, for example, possesses antipsychotic and antianxiety properties as demonstrated by its effects on locomotor activity, ptosis and ability to inhibit the seizures caused by pentylenetetrazole. By these procedures, compound A demonstrated greater potency than the known compound D, oxypertine [Merck Index, 8th Edition, page 776 (1968)].

In addition to potency, differences between compound A and compound D lie in the fact that compound D has a much smaller ratio between the dose causing catalepsy ($\geq 50\%$) and the dose reducing motor activity (ca 15/9.4) while for compound A the ratio was (50/3.3). According to Stille, G. and Hippius, H., "Critical Appraisal of Neuroleptic Agents", Pharmakopsychiat. Neuropsychopharm., Vol 4, pp. 182–191 (1971) this response is valuable in predicting the incidence of extrapyramidal side effects. A higher ratio indicates the possibility of a low incidence of extrapyramidal side effects. It has also been found that there is a correlation among those compounds which are effective in protecting rats against gnawing and the occurrence of extrapyramidal signs. Compound A had no effect as an inhibitor of apomorphine induced gnawing at 66 mg./kg. orally, which is 20 times the motor depressant dose, while compound D caused a 50% inhibition at 22 mg./kg., which is about twice the motor depressant dose.

These results indicate that compound A of the present invention appears to lack activities predictive of extrapyramidal side effects, while known agents such as compound D and chlorpromazine show profiles predictive of significantly greater liability for these side effects.

The anti-anxiety or anxiolytic component of the tranquilizing profile of the compounds of this invention is illustrated by both protection vs. pentylenetetrazole and the effects on amphetamine stereotyped behavior. Compound A exhibits increased activity over compound D in the pentylenetetrazole test. In addition, according to Babbini, et al., "Enchancement of Amphetamine-Induced Stereotyped Behavior by Benzodiazepines", European Journal of Pharmacology, Vol. 13, pp. 330–340, (1971), chlorodiazepoxide, a well known anti-anxiety agent, has been shown to enhance certain aspects of amphetamine-induced stereo-type behavior. Compound A possesses this property which is similar to chlorodiazepoxide, but compound D does not.

The overall classification of psychotherapeutic activity of the active components of this invention, exemplified by compound A, indicate bipolar antipsychotic and anxioltic actions with improved activity over the known compound D, and with activities predictive of lower side effects than compound D and other antipsychotic agents such as chlorpromazine.

The present compounds, generally in the form of nontoxic salts, may be administered orally or parenterally and when so administered, produce a therapeutically desirable effect on the central nervous system.

A wide range of doses may be employed. Individual doses may range from about 1 to 100 mg., and a preferred range is from about 2 to 25 mg. The dosage range is adjusted to provide an optimum therapeutic response, in the warm-blooded animal being treated. Thus, for example, several doses may be administered daily, or the dose may be reduced proportionately as indicated by the exigencies of the therapeutic situation. The daily dosage range is from about 0.1 to about 10 mg./kg. with a preferred range, in many warm-blooded animals of about 0.2 to about 5 mg./kg.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warmblooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such as active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The following examples describe in detail the preparation of representative compounds of the present invention.

EXAMPLE 1

Preparation of ethyl 5,6-dimethoxy-2-oxo-$\Delta 3,\alpha$-indolineglycolate

To a solution of 4.82 g. of 5,6-dimethoxyoxindole [J. Am. Chem. Soc. 77, 3844 (1955)] in 50 ml. of dimethylformamide stirred in an ice-bath in an argon atmosphere is added 1.25 g. of a sodium hydride in oil dispersion (60.2% concentration). The mixture is stirred for 30 minutes and then a solution of 5.35 g. of diethyl oxalate in 25 ml. of dimethylformamide is added dropwise. The solution is stirred at ambient temperature for 18 hours, then diluted with 150 ml. of water. The aqueous solution is stirred in an ice-bath and acidified with hydrochloric acid. The resultant red solid is collected and recrystalized from acetone affording ethyl 5,6-dimethoxy-2-oxo-$\Delta 3,\alpha$-indolineglycolate, melting point 183°–185°C. dec.

EXAMPLE 2

Preparation of ethyl 5,6-dimethoxy-2-oxo-$\Delta 3,\alpha$-3-indolineacetate

To a suspension of 0.73 g. of ethyl 5,6-dimethoxy-2-oxo-$\Delta 3,\alpha$-indolineglycolate in 50 ml. of acetic acid is added freshly prepared zinc amalgam (from 11 g. zinc and 1.1 g. mercuric chloride). The mixture is stirred under reflux for 16 hours. The mixture is cooled and filtered and the filtrate is reduced in volume to 10 ml. under reduced pressure. The residue is diluted with 50 ml. of water and extracted with ether. The ether extract is washed with saturated sodium carbonate solution and saturated sodium chloride solution, then dired with magnesium sulfate and evaporated to dryness under reduced pressure. The resultant solid mass crystallizes from acetone-petroleum ether (30°–60°C.) affording ethyl 5,6-dimethoxy-2-oxo-3-indolineacetate, melting point 123°–124°C.

EXAMPLE 3

Preparation of 5,6-dimethoxy-3-indolineethanol

To a solution of 1.95 g. of ethyl 5,6-dimethoxy-2-oxindoleacetate in 100 ml. of tetrahydrofuran stirred in an ice-bath in an argon atmosphere is added 40 ml. of 1M borane in tetrahydrofuran. The mixture is stirred for 15 hours at ambient temperature and then heated under reflux for 18 hours. The solvent is removed under reduced pressure and the residue is heated at 100°C. with 100 ml. 1N hydrochloric acid. The acid solution is cooled and washed with ethyl acetate, then cooled in an icebath and made alkaline with aqueous sodium hydroxide solution. The alkaline solution is extracted with ethyl acetate. The organic extract is washed with saturated sodium chloride, dried with magnesium sulfate and evaporated under reduced pressure affording 1.23 g. of 5,6-dimethoxy-3-indolineethanol as a gum.

EXAMPLE 4

Preparation of 5,6-dimethoxy-3-indoleethanol

To a partial solution of 2.93 g. of ethyl 5,6-dimethoxy-2-oxo-Δ3,α-indolineglycolate in 150 ml. of tetrahydrofuran stirred at −5°C. in an atmosphere of argon is added 80 ml. of a 1M solution of borane in tetrahydrofuran. The solution is stirred at −5°C. for one hour, stirred at ambient temperature for three hours and finally heated at reflux temperature for eighteen hours. The solvent is removed under reduced pressure and the residue is heated with 100 ml. of 1N sodium hydroxide on the steam bath for one hour. The cooled alkaline solution is extracted with ethyl acetate. The ethyl acetate solution is extracted with 1N hydrochloric acid. The hydrochloric acid extract is rendered alkaline with 5N sodium hydroxide, extracted with ethyl acetate and the extract evaporated under reduced pressure affording 0.82 g. of 5,6-dimethoxy-3-indolineethanol.

EXAMPLE 5

Preparation of 1-acetyl-5,6-dimethoxy-3-indoleethanol

A solution of 1.23 g. of 5,6-dimethoxyindoline-3-ethanol in 60 ml. of 0.5N hydrochloric acid is rendered alkaline with 10N sodium hydroxide. The mixture is stirred in an icebath and 12 ml. of acetic anhydride is added dropwise. The mixture is stirred at ambient temperature for 15 minutes maintaining alkalinity by addition of sodium hydroxide solution. An additional 12 ml. of acetic anhydride is added and the mixture is stirred for one hour. The solution is extracted with ethyl acetate and the extracts are washed with saturated sodium chloride solution, dried with magnesium sulfate solution and evaporated under reduced pressure. The residual gum is crystallized from acetone-petroleum ether (30°–60°C.) affording 1-acetyl-5,6-dimethoxy-3-indoleethanol, melting point 148°–150°C.

EXAMPLE 6

Preparation of 4,5-methylenedioxy-2-nitrophenylacetic acid

A suspension of 25 g. of 4,5-methylenedioxyphenyl acetic acid [J. Org. Chem. 17, 568 (1952)] in 110 ml. of acetic acid is stirred at 15°C. while 40.5 ml. of concentrated nitric acid is added in portions maintaining the temperature at 40°C. The mixture is stirred for an additional 40 minutes, then added to 800 ml. of ice water. The 4,5-methylenedioxy-2-nitrophenylacetic acid is collected at 24.5 g. of yellow crystals, melting point 185°–188°C.

EXAMPLE 7

Preparation of methyl 4,5-methylenedioxy-2-nitrophenylacetate

A solution of 25 g. of 4,5-methylenedioxy-2-nitrophenylacetic acid and 1 ml. concentrated sulfuric acid in 500 ml. methanol is heated at reflux temperature for 18 hours. The solution is cooled and 5 g. of anhydrous sodium acetate is added. The resultant precipitate is collected and washed with water affording 17.8 g. of methyl 4,5-methylenedioxy-2-nitrophenylacetate, melting point 106°–108°C. Dilution of the filtrate with water affords an additional 5.8 g. of product, melting point 106°–108°C.

EXAMPLE 8

Preparation of methyl 2-amino-4,5-methylenedioxyphenylacetate

A mixture of 11 g. of methyl 2-nitro-4,5-methylenedioxyphenylacetate and 1.1 g. of 10 per cent palladium-on-charcoal catalyst in 200 ml. of ethanol is shaken with hydrogen until the theoretical amount of hydrogen is absorbed. The reaction mixture is filtered free of catalyst and evaporated under reduced pressure affording methyl 2-amino-4,5-methylenedioxyphenylacetate as a white solid.

EXAMPLE 9

Preparation of 5,7-dihydro-6H-1,3-dioxolo[4,5-f]indol-6-one

A solution of 1.0 g. of methyl 2-amino-4,5-methylenedioxyphenylacetate in 5 ml. of acetic acid is purged with argon and heated under reflux for 1 hour. The hot acetic acid solution is stirred and diluted with water until crystals form. The mixture is cooled and 660 mg. of 5,7-dihydro-6H-1,3-dioxolo[4,5-f]indol-6-one, melting point 222°–225°C., is collected by filtration.

EXAMPLE 10

Preparation of ethyl 5,6-dihydro-6-oxo-7H-1,3-dioxolo[4,5-f]-indole-Δ7,α-glycolate A solution of 5.31 g. of 5,7-dihydro-6H-1,3-dioxolo-[4,5-f]indol-6-one in 50 ml. of dimethylformamide is stirred in an ice-bath in an argon atmosphere with 1.45 g. of sodium hydride-in-oil dispersion (60.2 per cent concentration) for 30 minutes. To the reaction mixture is added a solution of 6.07 ml. of diethyloxalate in 25 ml. of dimethylformamide. The reaction solution is stirred at ambient temperature for 18 hours, then added to 150 ml. of water and acidified with concentrated hydrochloric acid. The resultant red precipitate is collected by filtration and recrystallized from acetone affording ethyl 5,6-dihydro-6-oxo-7H-1,3-dioxolo[4,5-f]indole-Δ7,α-glycolate, melting point 246°–248°C.

EXAMPLE 11

Preparation of ethyl 5,6-dihydro-6-oxo-7H-1,3-dioxolo[4,5-f]-indole-7-acetate

A suspension of 1.39 g. of ethyl 5,6-dihydro-6-oxo-7H-1,3-dioxolo[4,5f]-indole-Δ7,α-glycolate and 1.39 g. of 10 per cent palladium-on-charcoal catalyst in 50 ml. of acetic acid containing 0.25 ml. concentrated sulfuric acid is shaken with hydrogen until two mole equivalents of hydrogen are absorbed. The reaction mixture is filtered directly onto 1.0 g. of anhydrous sodium acetate and the filtrate is evaporated under reduced pressure. The residue is partitioned between water and ethyl acetate. The ethyl acetate solution is evaporated in vacuo and the residue crystallized from acetone-petroleum ether (30°–60°C.) affording ethyl 5,6-dihydro-6-oxo-7H-1,3-dioxolo-[4,5-f]indole-7-acetate, melting point 151°–152°C.

EXAMPLE 12

Preparation of ethyl 5,6-dihydro-6-oxo-7H-1,3-dioxolo[4,5-f]-indole-7-acetate

To a suspension of 1.39 g. of ethyl 5,6-dihydro-6-oxo-7H-1,3-dioxolo[4,5-f]indole-Δ7,α-glycolate in 50 ml. of acetic acid is added zinc amalgam prepared from 11 g. of zinc and 1.1 g. mercuric chloride. The mixture is stirred and heated at reflux for 18 hours, then cooled and filtered. The filtrate is evaporated under reduced pressure to a volume of 10 ml. and diluted with 100 ml. of water. The solution is extracted with ethyl acetate and the extracts washed successively with saline solution, sodium bicarbonate solution and with saline solution. The ethyl acetate is evaporated under reduced pressure and the residue crystallized from acetone-petroleum ether (30°–60°C.) affording ethyl 5,6-dihydro-6-oxo-7H-1,3-dioxolo[4,5-f]indole-7-acetate, melting point 150°–151°C.

EXAMPLE 13

Preparation of 6,7-dihydro-5H-1,3-dioxolo[4,5-f]indole-7-ethanol

To a solution of 1.0 g. of ethyl 5,6-dihydro-6-oxo-7H-1,3-dioxolo[4,5-f]indole-7-acetate in 50 ml. of tetrahydrofuran stirred at −5°C. in an atmosphere of argon is added 21.8 ml. of a 1M solution of borane in tetrahydrofuran. The solution is stirred at 0°C. for 15 minutes, at ambient temperature for 90 minutes and finally heated at reflux for 18 hours. The solvent is removed under reduced pressure and the residue is heated on the steam bath with 50 ml. of 1N hydrochloric acid for one hour. The solution is washed with ethyl acetate, rendered alkaline with 10N sodium hydroxide and extracted with ethyl acetate. The solvent is removed under reduced pressure leaving 0.6 g. of 6,7-dihydro-5H-1,3-dioxolo[4,5-f]indole7-ethanol as an amber oil.

EXAMPLE 14

Preparation of 5-acetyl-6,7-dihydro-5H-1,3-dioxolo[4,5-f]indole-7-ethyl acetate

A solution of 0.6 g. of 6,7-dihydro-5H-1,3-dioxolo-[4,5-f]indole-7-ethanol in 10 ml. of pyridine and 0.9 ml. of acetic anhydride is heated on the steam bath for two hours. The solution is cooled, diluted with water and extracted with ethyl acetate. The extract is washed with 1N hydrochloric acid and saline solution and evaporated under reduced pressure. The residue is crystallized from acetone-petroleum ether (30°–60°C.) affording 5-acetyl-6,7-dihydro-5H-1,3-dioxolo[4,5-f]indole-7-ethylacetate, melting point 93°–94°C.

EXAMPLE 15

Preparation of 5-acetyl-6,7-dihydro-5H-1,3-dioxolo[4,5-f]indole-7-ethanol

A solution of 200 mg. of 5-acetyl-6,7-dihydro-5H-1,3-dioxolo[4,5-f]indole-7-ethylacetate and 40 mg. of sodium methoxide in 10 ml. of methanol is heated at reflux for 2 hours, then evaporated under reduced pressure. The residue is partitioned between ethyl acetate and water. The ethyl acetate solution is separated and evaporated under reduced pressure. The residue is crystallized from acetone-petroleum ether (30°–60°C.) affording 5-acetyl-6,7-dihydro-5H-1,3-dioxolo[4,5-f]-indole-7-ethanol, melting point 140°–141°C.

EXAMPLE 16

Prpearation of ethyl 5,6-dimethoxy-2-methyl-3-indole acetate

A mixture of 3.8 g. (0.019 mole) of 3,4-dimethoxyphenylhydrazine hydrochloride, 2.4 ml. (0.017 mole) of ethyl levulinate, and 40 ml. of ethanolic hydrogen chloride is stirred under reflux for 30 minutes. The ethanol is evaporated under reduced pressure and the residue is diluted with water and extracted with ether. The extract is washed with aqueous sodium bicarbonate solution, dried over magnesium sulfate, and concentrated under reduce pressure. Crystallization from ether-petroleum ether affords ethyl 5,6-dimethoxy-2-methyl-3-indole acetate, melting point 78°–79°C.

EXAMPLE 17

Preparation of ethyl 5,6-dimethoxy-2-methyl-3-indoline acetate

A mixture of 3.0 g. (0.011 mole) of ethyl 5,6-dimethyloxy-2-methyl-3-indole acetate, 7.0 g. (0.059 mole) of tin, 35 ml. of ethanol, and 35 ml. of concentrated hydrochloric acid is heated under reflux for one hour. An additional 7.0 g. (0.059 mole) of tin is added and the mixture is heated under reflux for six hours. Excess tin is separated by filtration and the filtrate is evaporated under reduced pressure. The residue is diluted with water, rendered alkaline with aqueous sodium hydroxide solution, and extracted with ethyl acetate. The extract is dried over magnesium sulfate and concentrated under reduced pressure to yield ethyl 5,6-dimethoxy-2-methyl-3-indoline acetate as a yellow oil.

EXAMPLE 18

Preparation of 5,6-dimethoxy-2-methyl-3-indolineethanol

A suspension of 10 g. (0.26 mole) of lithium aluminum hydride in 300 ml. of tetrahydrofuran is stirred under an argon atmosphere while a solution of 20 g. (0.072 mole) of ethyl 5,6-dimethoxy-2-methyl-3-indolineacetate in 100 ml. of tetrahydrofuran is added. The mixture is stirred under reflux for two hours and then treated with aqueous sodium potassium tartrate solution. The precipitate is separated by filtration and washed with ethyl acetate. The filtrate is dried over magnesium sulfate and concentrated under reduced pressure to yield 5,6-dimethoxy-2-methyl-3-indolineethanol as a yellow oil.

EXAMPLE 19

Preparation of 1-benzoyl-5,6-dimethoxy-2-methyl-3-indolineethyl benzoate

A solution of 16 g. (0.069 mole) of 5,6-dimethoxy-2-methyl-3-indolineethanol in 100 ml. of pyridine is stirred while 16 g. (0.014 mole) of benzoyl chloride is added dropwise. The mixture is heated on a steam bath for 30 minutes and then partitioned between water and methylene chloride. The organic layer is separated, washed with aqueous sodium hydroxide solution and dilute hydrochloric acid, dried over magnesium sulfate, and concentrated under reduced pressure. The residual oil is crystallized from ether and recrystallized from methanol to yield 1-benzoyl-5,6-dimethoxy-2-methyl-3-indolineethyl benzoate, melting point 135°–136°C.

EXAMPLE 20

Preparation of
1-benzoyl-5,6-dimethoxy-2-methyl-3-indolineethanol

To a suspension of 3.0 g. (0.0068 mole) of 1-benzoyl-5,6-dimethoxy-2-methyl-3-indolineethyl benozate in 20 ml. of methanol is added 1.5 g. (0.028 mole) of sodium methoxide. The mixture is stirred under reflux for one hour and then evaporated under reduced pressure. The residue is diluted with water and extracted with ethyl acetate. The extract is dried over magnesium sulfate and concentrated in vacuo to yield 1-benzoyl-5,6-dimethoxy-2-methyl-3-indolineethanol as a yellow oil.

EXAMPLE 21

Preparation of
1-acetyl-3-(2-bromoethyl)-5,6-dimethoxyindoline

To a partial solution of 254 mg. of 1-acetyl-5,6-dimethoxy-3-indolineethanol in 25 ml. of benzene in an argon atmosphere is added one drop of pyridine and 0.056 ml. of phosphorous tribromide. The mixture is stirred and heated under reflux for 18 hours. The reaction is cooled and the benzene solution is decanted into 20 ml. of ice-water and 5 ml. of saturated sodium bicarbonate solution. The organic solution is separated, washed with saturated sodium bicarbonate solution and saturated sodium chloride solution. The organic extract is dried with magnesium sulfate, evaporated to dryness under reduced pressure and the residual gum crystallized from acetonepetroleum ether (30°–60°C.) affording 1-acetyl-3-(2-bromoethyl)-5,6-dimethoxyindoline, melting point 103°–105°C.

EXAMPLE 22

Preparation of
5-acetyl-6,7-dihydro-5H-1,3-dioxolo[4,5-f]indole-7-ethyl bromide

To a partial solution of 1.5 g. of 5-acetyl-6,7-dihydro-5H-1,3-dioxolo[4,5-f]indole-7-ethanol in 150 ml. of benzene purged with argon is added 10 drops of pyridine, and 0.35 ml. of phosphorus trimbromide. The mixture is stirred and heated at reflux for 18 hours. The mixture is cooled and the supernatant liquid is poured into 120 ml. of stirred ice-water and 70 ml. of saturated sodium bicarbonate solution. The organic phase is separated and evaporated under reduced pressure. The residual solid is crystallized from acetone-petroleum ether (boiling point 30°–60°C.) affording 5-acetyl-6,7-dihydro-5H-1,3-dioxolo[4,5-f]indole-7-ethyl bromide, melting point 147°–148°C.

EXAMPLE 23

Preparation of
1-benzoyl-3-(2-bromoethyl)-5,6-dimethoxy-2-methylindoline

A solution of 2.6 g. (0.0075 mole) of 1-benzoyl-5,6-dimethoxy-2-methyl-3-indolineethanol in 25 ml. of benzene is stirred under an argon atmosphere while two drops of pyridine, and 0.40 ml. (0.0042 mole) of phosphorus tribromide are added. The mixture is stirred under reflux for two hours and then poured into an ice-cold aqueous sodium bicarbonate solution. The ether extract of this mixture is washed with saturated aqueous sodium chloride solution, dried over magnesium sulfate, and concentrated under reduced pressure. Crystallization of the residue from ether, affords 1-benzoyl-3-(2-bromoethyl)-5,6-dimethoxy-2-methylindoline, melting point 125°–127°C.

EXAMPLE 24

Preparation of
1-acetyl-5,6-dimethoxy-3-{2-[4-(o-methoxyphenyl)-1-piperazinyl]ethyl}-indoline A solution of 200 mg. of 1-acetyl-3-(2-bromoethyl)-5,6-dimethoxyindoline and 250 mg. of 1-(o-methoxyphenyl)piperazine in 20 ml. of toluene is heated under reflux for 18 hours. The reaction mixture is cooled and filtered, and the filtrate is evaporated under reduced pressure. The residual gum is partitioned between ether and water. The organic solution is separated, washed with saturated sodium bicarbonate solution and sodium chloride solution. The ether solution is dried with magnesium sulfate and evaporated under reduced pressure. The residual gum is crystallized from ether-petroluem ether affording 1-acetyl-5,6-dimethoxy-3-{2-[4-(o-methoxyphenyl)-1-piperazinyl]ethyl}-indoline, melting point 149°–150°C.

EXAMPLE 25

Preparation of
1-acetyl-5,6-dimethoxy-3-[2-(4-phenyl-1-piperazinyl)ethyl]indoline In the manner described in Example 24 treatment of 2.37 g. (7.24 mmol) of 1-acetyl-3-(2-bromoethyl)-5,6-dimethoxyindoline with 2.35 g. (14.5 mmol) of 1-phenylpiperazine in 150 ml. of boiling toluene for 17 hours produces 1-acetyl-5,6-dimethoxy-3-[2-(4-phenyl-1-piperazinyl)ethyl]indoline.

EXAMPLE 26

Preparation of
5-acetyl-6,7-dihydro-7-{2-[4-(o-methoxyphenyl)piperazinyl]ethyl}-5H-1,3-dioxolo[4,5-f]indole In the manner described in Example 24, from 1.25 g. of 5-acetyl-6,7-dihydro-5H-1,3-dioxolo[4,5-f]indole-7-ethyl bromide and 1.51 g. of 1-(o-methoxyphenyl)piperazine is obtained 5-acetyl-6,7-dihydro-7- 2-[4-(o-methoxyphenyl)piperazinyl]ethyl--5H-1,3-dioxolo[4,5-f]indole, melting point 159°–160°C.

EXAMPLE 27

Preparation of
5-acetyl-6,7-dihydro-7-[2-(4-phenylpiperazinyl)ethyl]-5H-1,3-dioxolo[4,5-f]indole In the manner described in Example 23, from 0.5 g. of 5-acetyl-6,7-dihydro-5H-1,3-dioxolo[4,5-f]indole-7-ethyl bromide and 0.57 g. of 1-phenylpiperazine is obtained 5-acetyl-6,7-dihydro-7-[2-(4-phenylpiperazinyl)ethyl]-5H-1,3-dioxolo[4,5-f]-indole.

EXAMPLE 28

Preparation of
1-benzoyl-5,6-dimethoxy-2-methyl-3-[2-(4-phenyl-1-piperazinyl)ethyl]indoline A solution of 0.70 g. (0.0017 mole) of 1-benzoyl-3-(2-bromethyl)-5,6-dimethoxy-2-methylindoline and 1.1 g. (0.0069 mole) of N-phenylpiperazine in 20 ml. of toluene is stirred under reflux for 65 hours. The precipitate which forms is separated by filtration and the filtrate concentrated. The residue is partitioned between water and ethyl acetate and the organic layer is separated, dired over magnesium sulfate and concentrated to a yellow oil. Purification of the oil by chromatography on a synthetic magnesia-silica absorbent affords 1-benzoyl-5,6-dimethoxy-2-methyl-3-[2-(4-phenyl-1-piperazinyl)ethyl]indoline as a yellow glass.

EXAMPLE 29

Preparation of 1-benzoyl-5,6-dimethoxy-2-methyl-3- 2-[4-(o-methoxyphenyl)-1-piperazinyl]ethyl indoline A solution of 1.5 g. (0.0037 mole) of 1-benzoyl3-(2-bromoethyl)-5,6-dimethoxy-2-methylindoline and 2.2 g. (0.011 mole) of 1-(o-methoxyphenyl)piperazine in 50 ml. of benzene is stirred under reflux for 70 hours. The precipitate which forms is separated by filtration and the filtrate is washed with water, dried over magnesium sulfate, and concentrated to a yellow oil. The oil is purified by chromatography on a synthetic magnesia-silica adsorbent to yield 1-benzoyl-5,6-dimethoxy-2-methyl-3-{2-[4-(o-methoxyphenyl)-1-piperazinyl]e-}thyl indoline as a yellow glass. This substance gives a dihydrochloride monohydrate upon treatment with etheral hydrogen chloride. This salt is obtained from ethanol-ether as white crystals, melting point 199°-200°C. (decomp.).

EXAMPLE 30

Preparation of 6,7-dihydro-7-{2-[4-(o-methoxyphenyl)piperazinyl]ethyl}-5H-1,3-dioxolo[4,5-f]indole difumarate A solution of 500 mg. of 5-acetyl-6,7-dihydro-7-{2-[4-(o-methoxyphenyl)piperazinyl]ethyl}-5-H1,3-dioxolo[4,5-f]indole and 10 ml. of 6N hydrochloric acid is heated at reflux for 15 minutes. The solution is treated with activated charcoal, filtered and evaporated under reduced pressure. The residual gum is evaporated several times with ethanol. The resulting glass is dissolved in ethanol, treated with activated charcoal and the solvent removed under reduced pressure. The residual glass is dissolved in water. The aqueous solution is rendered alkaline with 10N sodium hydroxide, and extracted with ethyl acetate. The ethyl acetate solution is evaporated under reduced pressure affording 6,7-dihydro-7-{2-[4-(o-methoxyphenyl)piperazinyl]ethyl}-5H-1,3-dioxolo[4,5-f]indole, the difumarate of which has melting point 193°-195°C.

EXAMPLE 31

Preparation of 6,7-dihydro-7-[2-(4-phenylpiperazinyl)ethyl]-5H-1,3-dioxolo[4,5-f]indole In the manner described in Example 30 a solution of 5-acetyl-6,7-dihydro-7-[2-(4-phenylpiperazinyl)ethyl]-5-H-1,3-dioxolo[4,5-f]indole and 6N hydrochloric acid gives the product as the trihydrochloride salt.

EXAMPLE 32

Preparation of 5,6-dimethoxy-2-methyl-3-{2-[4-(o-methoxyphenyl)-1-piperazinyl]ethyl}-indoline In the manner described in Example 30 a solution of 1-benzoyl-5,6-dimethoxy-2-methyl-3-{2-[4-(o-methoxyphenyl)-1-piperazinyl]ethyl} -indoline in 6N hydrochloric acid is heated at reflux temperature for 15 minutes. Removal of the solvent furnishes the hydrochloride salt of 5,6-dimethoxy-2-methyl-3-2-[4-(o-methoxyphenyl)-1-piperazinyl]ethyl -indoline.

EXAMPLE 33

Preparation of 5,6-dimethoxy-3-[2-(4-phenyl-1-piperazinyl)ethyl]indoline

In the manner described in Example 30 a solution of 1-acetyl-5,6-dimethoxy-3-[2-(4-phenyl-1-piperazinyl)ethyl]indoline in 6N hydrochloric acid is heated at reflux temperature for 15 minutes. Removal of the solvent furnishes 5,6-dimethoxy-3-[2-(4-phenyl-1-piperazinyl)ethyl]indoline trihydrochloride.

EXAMPLE 34

Preparation of 5,6-dimethoxy-2-methyl-3-[2-(4-phenyl-1-piperazinyl)ethyl]indoline A solution of 0.32 g. (0.00066 mole) of 1-benzoyl-5,6-dimethoxy-2-methyl-3-[2-(4-phenyl-1-piperazinyl)ethyl]-indoline in 10 ml. of 6N hydrochloric acid is stirred under reflux for 30 minutes and then poured into 50 ml. of ice-cold aqueous sodium bicarbonate solution. The mixture is rendered alkaline with 10N sodium hydroxide solution and extracted with methylene chloride. The extract is dried over magnesium sulfate and concentrated to a yellow oil. Crystallization from ether affords 5,6-dimethoxy-2-methyl-3-[2-(4-phenyl-1-piperazinyl)ethyl]indoline, melting point 112°-113°C.

EXAMPLE 35

| Preparation of 2.5 mg. tablets | | |
|---|---|---|
| | Per tablet, grams | For 10,000 tablets grams |
| Active ingredient: Compound A | 0.0025 | 25 |
| Lactose | 0.080 | 800 |
| Corn starch (for mix) | 0.010 | 100 |
| Corn starch (for paste) | 0.008 | 75 |
| Total | 0.1005 | 1000 |
| Magnesium stearate (1%) | 0.001 | 10 |
| Grand Total | 0.1015 | 1,010 |

Compound A is that of Table 1.

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1% magnesium stearate and compressed into tablets in a suitable tableting machine.

EXAMPLE 36

Preparation of 5.0 mg. tablets

|  | Per tablet, grams | For 10,000 tablets, grams |
|---|---|---|
| Active ingredient: Compound A | 0.005 | 50 |
| Lactose | 0.080 | 800 |
| Corn starch (for mix) | 0.010 | 100 |
| Corn starch (for paste) | 0.008 | 75 |
| Total | 0.103 | 1,025 |
| Magnesium (1%) | 0.001 | 10 |
| Grand Total | 0.104 | 1,035 |

Compound A is that of Table I.

The active ingredient lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1% magnesium stearate and compressed into tablets in a suitable tableting machine.

EXAMPLE 37

Preparation of 10 mg. tablets

|  | Per tablet, grams | For 10,000 tablets, grams |
|---|---|---|
| Active ingredient: Compound A | 0.010 | 100 |
| Lactose | 0.080 | 800 |
| Corn starch (for mix) | 0.015 | 150 |
| Corn starch (for paste) | 0.010 | 100 |
| Total | 0.115 | 1,150 |
| Magnesium stearate (1%) | 0.001 | 12 |
| Grand Total | 0.116 | 1,162 |

Compound A is that of Table I.

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1% magnesium stearate and compressed into tablets in a suitable tableting machine.

EXAMPLE 38

Preparation of 10 mg. tablets

|  | Per tablet, grams | For 10,000 tablets, grams |
|---|---|---|
| Active ingredient: Compound B | 0.010 | 100 |
| Lactose | 0.080 | 800 |
| Corn starch (for mix) | 0.015 | 150 |
| Corn starch (for paste) | 0.010 | 100 |
| Total | 0.115 | 1,150 |

EXAMPLE 38-Continued

Preparation of 10 mg. tablets

|  | Per tablet, grams | For 10,000 tablets, grams |
|---|---|---|
| Magnesium stearate (1%) | 0.001 | 12 |
| Grand Total | 0.116 | 1,162 |

Compound B is that of Table II.

The active ingredient, lactose and corn starch (for mix) are blended together. The corn starch (for paste) is suspended in 600 ml. of water, and heated, with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1% magnesium stearate and compressed into tablets in a suitable tableting machine.

EXAMPLE 39

Preparation of 10 mg. tablets

|  | Per tablet, grams | For 10,000 tablets, grams |
|---|---|---|
| 5,6-dimethoxy-3-[2-(4-phenyl-1-piperazinyl)ethyl]indoline | 0.010 | 100 |
| Lactose | 0.080 | 800 |
| Corn starch (for mix) | 0.015 | 150 |
| Corn starch (for paste) | 0.010 | 100 |
| Total | 0.115 | 1,150 |
| Magnesium stearate (1%) | 0.001 | 12 |
| Grand Total | 0.116 | 1,162 |

The active ingredient, lactose and corn starch (for mix) are blended together. The corn starch (for paste) is suspended in 600 ml. of water, and heated, with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1% magnesium stearate and compressed into tablets in a suitable tableting machine.

EXAMPLE 40

Preparation of oral syrup

| Ingredient: | Amount |
|---|---|
| Active ingredient: Compound A | 100 |
| Sorbitol solution (70% N.F.), ml. | 40 |
| Sodium benzoate, mg. | 150 |
| Saccharin, mg. | 10 |
| Red dye (F.D. & C. No. 2), mg. | 10 |
| Cherry flavor, mg. | 50 |
| Distilled water, q.s. ad 100 ml. |  |

Compound A is that of Table I.

The sorbital solution is added to 40 ml. of distilled water and the active ingredient is suspended therein.

The saccharin, sodium benzoate, flavor and dye are added and dissolved in the above solution. The volume is adjusted to 100 ml. with distilled water. Each ml. of syrup contains 1 mg. of drug.

Other ingredients may replace those listed in the above formulation. For example, a suspending agent such as bentonite magma, tragacanth, carboxymethylcellulose or methyl-cellulose may be used. Phosphates, citrates or tartrates may be added as buffers. Preservatives may include the parabens, sorbic acid and the like and other flavors and dye may be used in place of those listed above.

EXAMPLE 41

Preparation of parenteral solution

In a solution of 700 ml. of propylene glycol and 200 ml. of water for injection is dissolved 5.0 g. of 5,6-dimethyoxy-2-methyl-3-[2-(4-phenyl-1-piperazinyl)ethyl]indoline with stirring. After dissolution is complete, a solution of 2.5 g. of ascorbic acid in 20 ml. of water for injection is then added to the formulation. The pH of this solution is then adjusted to 5.5 with hydrochloric acid and the volume is made up to 1000 ml. with distilled water. The formulation is filtered through a 0.22 micron sterilizing filter, filled into 5.0 ml. ampoules each containing 2.0 ml. (representing 10 mg. of drug) and sealed under nitrogen.

EXAMPLE 42

Preparation of lyophilized parenteral formulation

The pH of a stirred mixture of 5.0 g. of 5,6-dimethoxy-2-methyl-3-[2-(4-phenyl-1-piperazinyl)ethyl]indoline and 900 ml. of water for injection is maintained at 3.5 by the addition of hydrochloric acid until the solid has dissolved. Manitol (27 g.) is added and dissolved and the volume is made up to 1000 ml. with water for injection. After the solution is sterilized by passage through a 0.22 micron filter, it is filled in 5.0 ml. portions into 10 ml. vial and lyophilized. To reconstitute, 5.0 ml. of water for injection is added to a vial, giving a solution which is stable for at least 24 hours.

We claim:

1. A method for the therapeutic management of the manifestations of psychotic disorders, pyschoneurotic conditions, anxiety and tension in a warm-blooded animal which comprises administering orally or parenterally to said animal an antipsychotic or antipsychoneuritic or antianxiety amount of a compound of the formula:

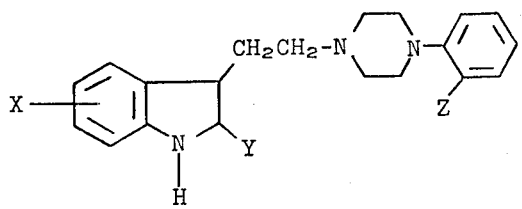

wherein X is 5,6-dimethoxy or 5,6-methylenedioxy, Y is hydrogen or methyl, and Z is hydrogen or methoxy, with the proviso that when X is 5,6-dimethoxy and Z is methoxy, then Y must be methyl; or a pharmacologically acceptable acid-addition salt thereof.

2. A method according to claim 1, wherein the compound is 5,6-dimethoxy-3-[2-(4-phenyl-1-piperazinyl)ethyl]indoline.

3. A method according to claim 1, wherein the compound is 5,6-dimethoxy-2-methyl-3-[2-(4-phenyl-1-piperazinyl)-ethyl]indoline.

4. A method according to claim 1, wherein the compound is 5,6-dimethoxy-2-methyl-3-{2-[4-(o-methoxyphenyl)-1-piperazinyl]ethyl}-indoline.

5. A method according to claim 1, wherein the compound is 5,6-methylenedioxy-3-[2-(4-phenyl-1-piperazinyl)-ethyl]-indoline.

6. A method according to claim 1, wherein the compound is 5,6-methylenedioxy-2-methyl-3-[2-(4-phenyl-1-piperazinyl)ethyl]indoline.

7. A method according to claim 1, wherein the compound is 5,6-methylenedioxy-3-{2-[4-(o-methoxyphenyl)-1-piperazinyl]ethyl}-indoline.

8. A method according to claim 1, wherein the compound is 5,6-methylenedioxy-2-methyl-3-{2-[4-(o-methoxyphenyl)-1-piperazinyl]ethyl}-indoline.

9. A composition for the therapeutic management of the manifestations of psychotic disorders, psychoneurotic conditions, anxiety and tension in a warm-blooded animal which comprises from about 1 mg. to about 100 mg. of a compound of the formula:

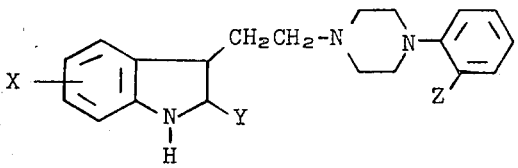

wherein X is 5,6-dimethoxy or 5,6-methylenedioxy, Y is hydrogen or methyl, and Z is hydrogen or methoxy, with the proviso that when X is 5,6-dimethoxy and Z is methoxy, then Y must be methyl; or a pharmacologically acceptable acid-addition salt thereof and a pharmaceutically acceptable carrier.

10. A composition according to claim 9, wherein the compound is 5,6-dimethoxy-2-methyl-3-[2-(4-phenyl-1-piperazinyl)ethyl]indoline.

* * * * *